ви
(12) United States Patent
Kobayashi

(10) Patent No.: US 8,413,152 B2
(45) Date of Patent: Apr. 2, 2013

(54) JOB SCHEDULER, JOB SCHEDULING METHOD, AND JOB CONTROL PROGRAM STORAGE MEDIUM

(75) Inventor: Akihiro Kobayashi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1205 days.

(21) Appl. No.: 12/077,170

(22) Filed: Mar. 17, 2008

(65) Prior Publication Data

US 2008/0235697 A1      Sep. 25, 2008

(30) Foreign Application Priority Data

Mar. 20, 2007    (JP) ................................ 2007-072548

(51) Int. Cl.
 *G06F 9/46* (2006.01)
(52) U.S. Cl. ............. 718/102; 710/36; 710/51; 711/169
(58) Field of Classification Search .......................... None
See application file for complete search history.

(56) References Cited

U.S. PATENT DOCUMENTS

| 6,993,765 | B2 | 1/2006 | Suzuki et al. | |
| 7,721,290 | B2* | 5/2010 | Horikawa | 718/104 |
| 2006/0190943 | A1* | 8/2006 | Haeri | 718/103 |
| 2007/0113231 | A1* | 5/2007 | Honmura | 718/100 |

FOREIGN PATENT DOCUMENTS

| JP | 62-210546 | 9/1987 |
| JP | 2003-067201 | 3/2003 |

* cited by examiner

*Primary Examiner* — Emerson Puente
*Assistant Examiner* — Sisley Kim
(74) *Attorney, Agent, or Firm* — Jordan and Hamburg LLP

(57) ABSTRACT

To provide a job scheduler, a job scheduling method, and a job control program that are capable of, even with an incapable CPU not equipped with a real-time OS, meeting basic real-time property that is required in a system. The job scheduler is a job scheduler 5 for calling each of a plurality of jobs for controlling an appliance to a main loop and causing each job to be executed. The job scheduler 5 carries out calling control including: dividing the jobs into a plurality of groups according to a degree of need for real-time processing of each jobs; setting a priority on a group basis; and restricting a calling frequency, per cycle, of a job belonging to a group of low priority to a minimum tolerated frequency.

5 Claims, 3 Drawing Sheets

JOB SCHEDULER, JOB SCHEDULING METHOD, AND JOB CONTROL PROGRAM STORAGE MEDIUM

This application is based on an application No. 2007-072548 filed in Japan, the contents of which are hereby incorporated by reference.

BACKGROUND OF THE INVENTION

1. Field of the Invention

The present invention relates to a job scheduler, a job scheduling method, and a job control program that cause a plurality of jobs for controlling an appliance to be executed by being called to a main loop. Particularly, the present invention relates to a job scheduler, a job scheduling method, and a job control program storage medium that provide improvement in real-time property of embedded software not equipped with a real-time operating system (hereinafter referred to as real-time OS).

2. Description of the related art

Generally, embedded software for controlling information processing devices represented by widely used printer machines, copying machines, facsimile machines, and the like is equipped with a real-time operating system, and programs are executed under the OS's supervision.

The real-time OS divides processing units (jobs) to be controlled, assigns a concept called tasks to jobs that need to be executed in parallel, and carries out executing control of the tasks by automatically determining an order for the tasks according to preset priorities.

If the processings to be executed are not complicated, the embedded software is in many cases provided with, instead of the real-time OS, a job scheduler that sequentially calls the processings during processing generally called main loop processing.

The embedded software employing this main loop structure is constituted to complete execution of the jobs called to a main loop from the job scheduler in a shortest period of time, and to return the processings to the job scheduler.

In Japanese Unexamined Patent Publication 2003-67201, there is disclosed a controller that is intended to secure the real-time property of control processing and at the same time secure the throughput of network communication processing.

The controller described in the above publication has a program including a plurality of tasks and an operating system for carrying out executing control of the tasks. The controller supervises the tasks by dividing them into a communication task group for communication with a network communication system and a control task group for carrying out monitoring control of an object of monitoring control, switches the order of execution of the plurality of tasks on a group basis, and, according to switched tasks, executes processing of information obtained from the network communication system or the object of monitoring control.

However, mounting the real-time OS necessitates the memory to have a memory area called task control block (TCB) for storing the states of the tasks, thereby posing the problem of increase in the required size of RAM.

Further, calling of the tasks by the real-time OS is hitherto unnecessary processing, which results in a waste of time. This wasted time is generally called overhead time.

No such problems occur in the case where no real-time OS is mounted. Still, since the processing of sequentially calling the jobs to the main loop is repeated, if there is a time-demanding job, such a problem may occur that if some other job is being called by the job scheduler, the calling by the job scheduler of the time-demanding job is delayed.

If the CPU is capable enough to accommodate the total execution period of time to call the tasks, problems associated with the real-time property do not occur, since each job is accorded execution authority in shortest time required. However, in the case of an incapable CPU lacking in processability, such a crucial problem occurs that the system-requiring real-time property is not met.

SUMMARY OF THE INVENTION

In view of the foregoing problems, an object of the present invention is to provide a job scheduler, a job scheduling method, and a job control program that are capable of, even with an incapable CPU not equipped with the real-time OS, meeting basic real-time property that is required in a system.

In order to achieve the foregoing object, a job scheduler of the present invention is a job scheduler for calling each of a plurality of jobs for controlling an appliance to a main loop and causing each job to be executed. The job scheduler carries out calling control including: dividing the jobs into a plurality of groups according to a degree of need for real-time processing of each jobs; setting a priority on a group basis; and restricting a calling frequency, per cycle of the main loop, of a job belonging to a group of low priority to a minimum tolerated frequency.

Further, other aspects of the present invention will become clear by referring to embodiments provided hereinafter.

DESCRIPTION OF THE PREFERRED EMBODIMENTS

A job scheduler of the present invention will be described hereinafter by referring to an example where the job scheduler is applied to embedded software executed by a micro-computer for controlling a copier.

Figure 1:
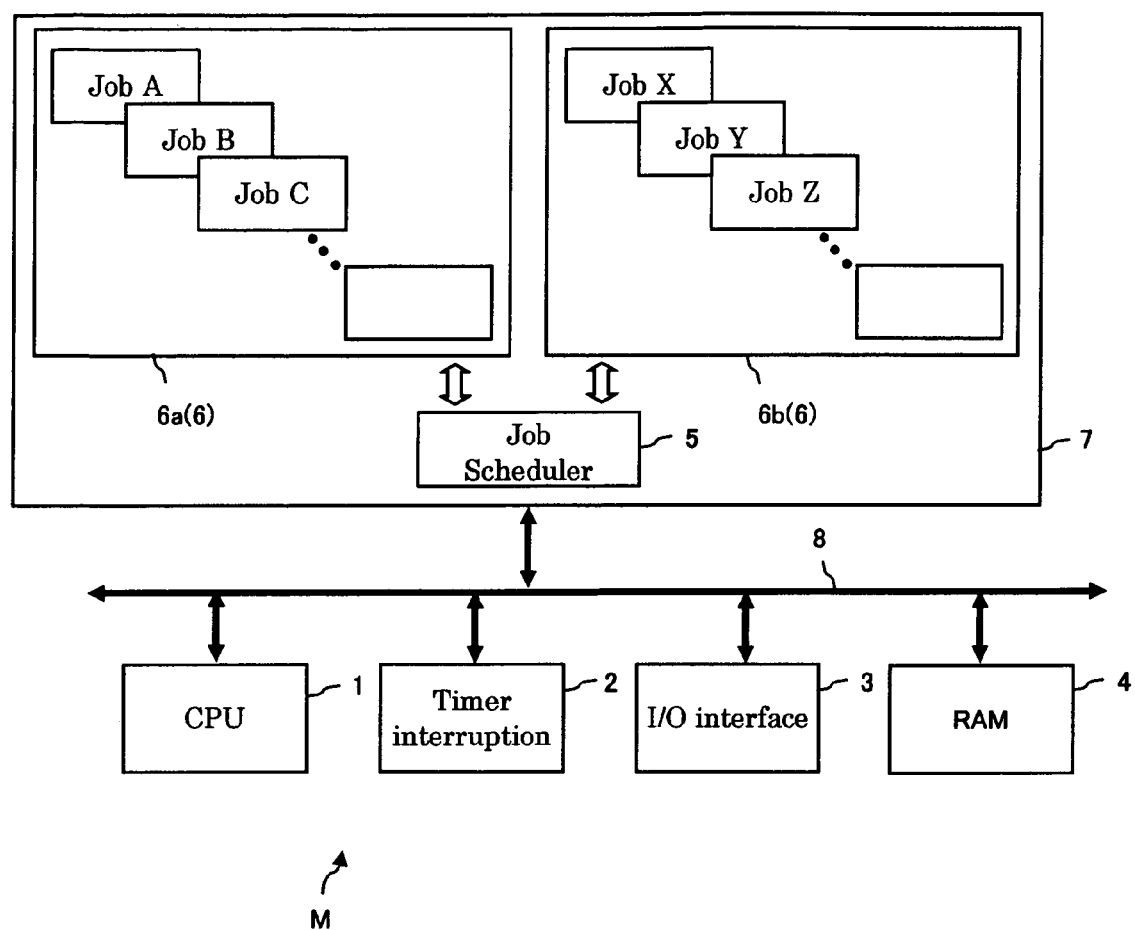
FIG. 1 is a configuration diagram of a micro-computer with a job scheduler of the present invention embedded therein.

As shown in FIG. 1, a micro-computer M for controlling a copier is constituted by connecting together, via an inner bus 8, a CPU 1, a ROM 7 storing embedded software 6 executed at CPU 1, a RAM 4 used as a data area and a working area for the CPU 1, a timer interruption part 2, an I/O interface part 3, and the like.

The embedded software 6 stored in the ROM 7 is a program for executing an image forming operation by controlling elements embedded in the copier, such as a photoreceptor, a development device, a fixing device, and a transferring device. By execution of the program by the micro-computer M, a predetermined function is realized.

The program has a plurality of jobs 6 and a job control program 5 for calling each of the jobs 6 to a main loop and causing each job 6 to be executed, the jobs 6 including a transferring control job A for transferring recording sheets while monitoring them with sensors arranged along the transfer path, a temperature control job B for controlling fixing temperature with a heater embedded in the fixing part, an imaging control job C for forming a toner image by controlling image-forming timing of an image-forming block that includes a photoreceptor, an open/close detecting control job X for the cover of the copier, a temperature/humidity detecting control job Y for monitoring interior environment, and a control job Z for a dehumidifying heater mounted in the copier.

The micro-computer M executing the transferring control job A constitutes a transferring control part, the micro-computer M executing the temperature control job B constitutes a temperature control part, and the micro-computer M executing the imaging control job C constitutes an imaging control part.

The micro-computer M executing the cover open/close detecting control job X constitutes a cover open/close detecting control part, the micro-computer M executing the temperature/humidity detecting control job Y constitutes a temperature/humidity detecting control part, and the micro-computer M executing the dehumidifying heater control job Z constitutes a dehumidifying heater control part.

Further, the micro-computer M executing the job control program constitutes a job scheduler 5.

Figure 2:
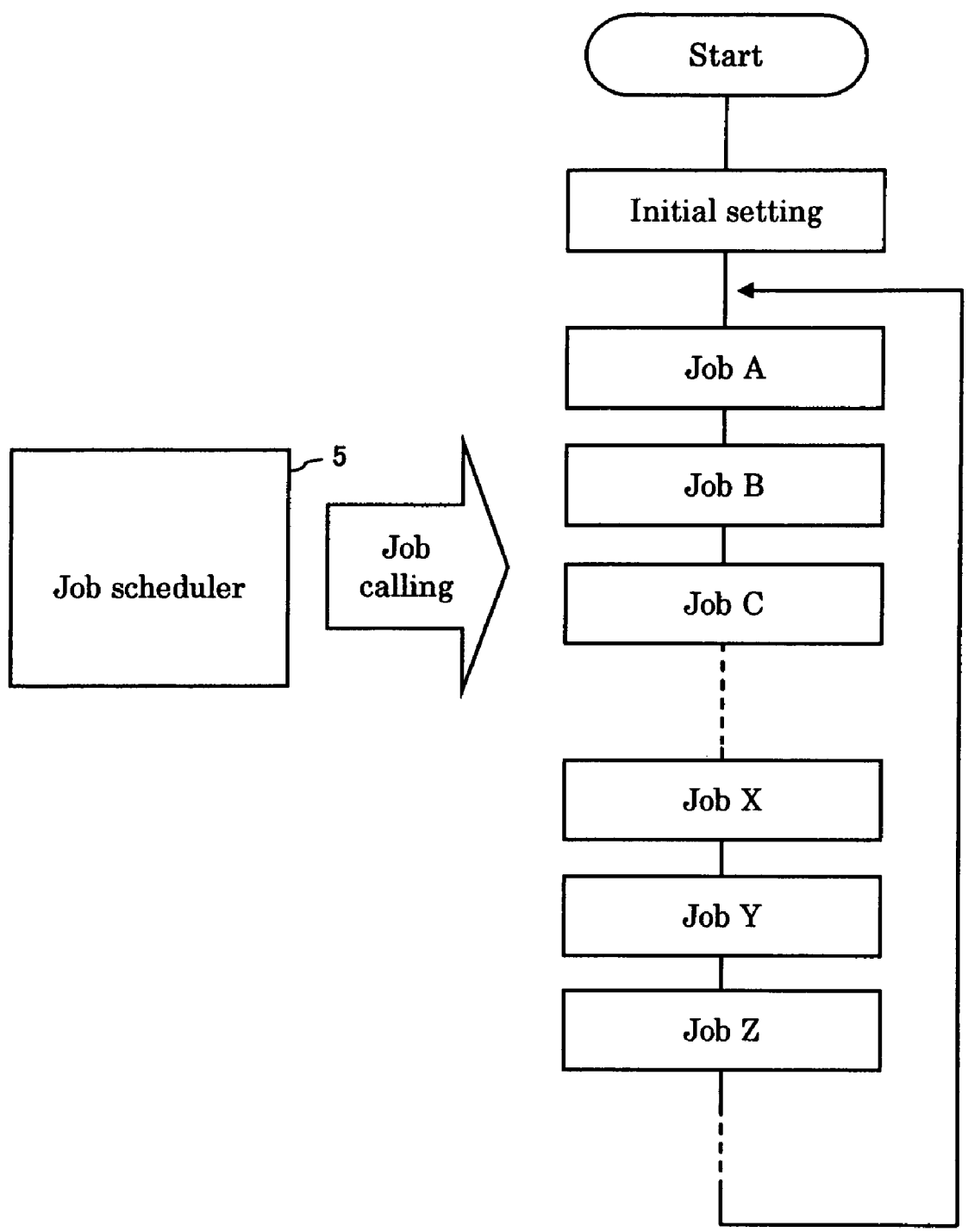
FIG. 2 is a flow chart showing an execution procedure for a job called by the job scheduler.

As shown in FIGS. 1 and 2, the micro-computer M, upon application of power thereto, reads an initialization program from the ROM 7 to carry out initial setting of the values of an internal resistor and RAM, and then reads the job control program from the ROM 7 to carry out main loop processing. That is, the above-described micro-computer M does not have a real-time operating system involved.

The job scheduler 5 has a control part for starting interruption processing by setting a resistor for the timer interruption part 2 to effect a timer interruption against the CPU 1 at predetermined intervals, and for carrying out polling processing of calling the jobs to the main loop in a predetermined order.

Data, among input/output data input via the I/O interface 3 from the elements, that needs accuracy is controlled by the timer interruption processing, and other input/output processing is executed via the I/O interface 3 during execution of the jobs.

FIG. 2 shows usual polling processing where the job scheduler 5 calls the jobs A, B, C, . . . , and the jobs X, Y, Z, . . . , and upon completion of processing of the jobs, one cycle of the main loop is terminated, followed by calling again the jobs A, B, C, . . . .

As in the manner described above, when all the jobs are processed on the main loop in order, an increase in the period of time for one cycle of the main loop may undermine the real-time property of control.

For example, the jobs associated with the image forming operation, such as the jobs A, B, and C, are demanding in respect of real-time property; a delay in processing by the order of several micro-seconds to several tens of micro-seconds may disable the normal transfer of recording sheets, resulting in inconveniences including failure to normally form an image.

On the other hand, the jobs for monitoring device environment and the like, such as the jobs X, Y, and Z, are less demanding in respect of real-time property and thus experience no significant inconveniences insofar as the order of several hundreds of micro-seconds to several seconds is secured for processing.

In view of this, the job scheduler 5 carries out calling control including: dividing the jobs into a plurality of groups according to a degree of need for real-time processing of each jobs; setting a priority on a group basis; and restricting a calling frequency, per cycle, of a job belonging to a group of low priority to a minimum tolerated frequency.

Figure 3:
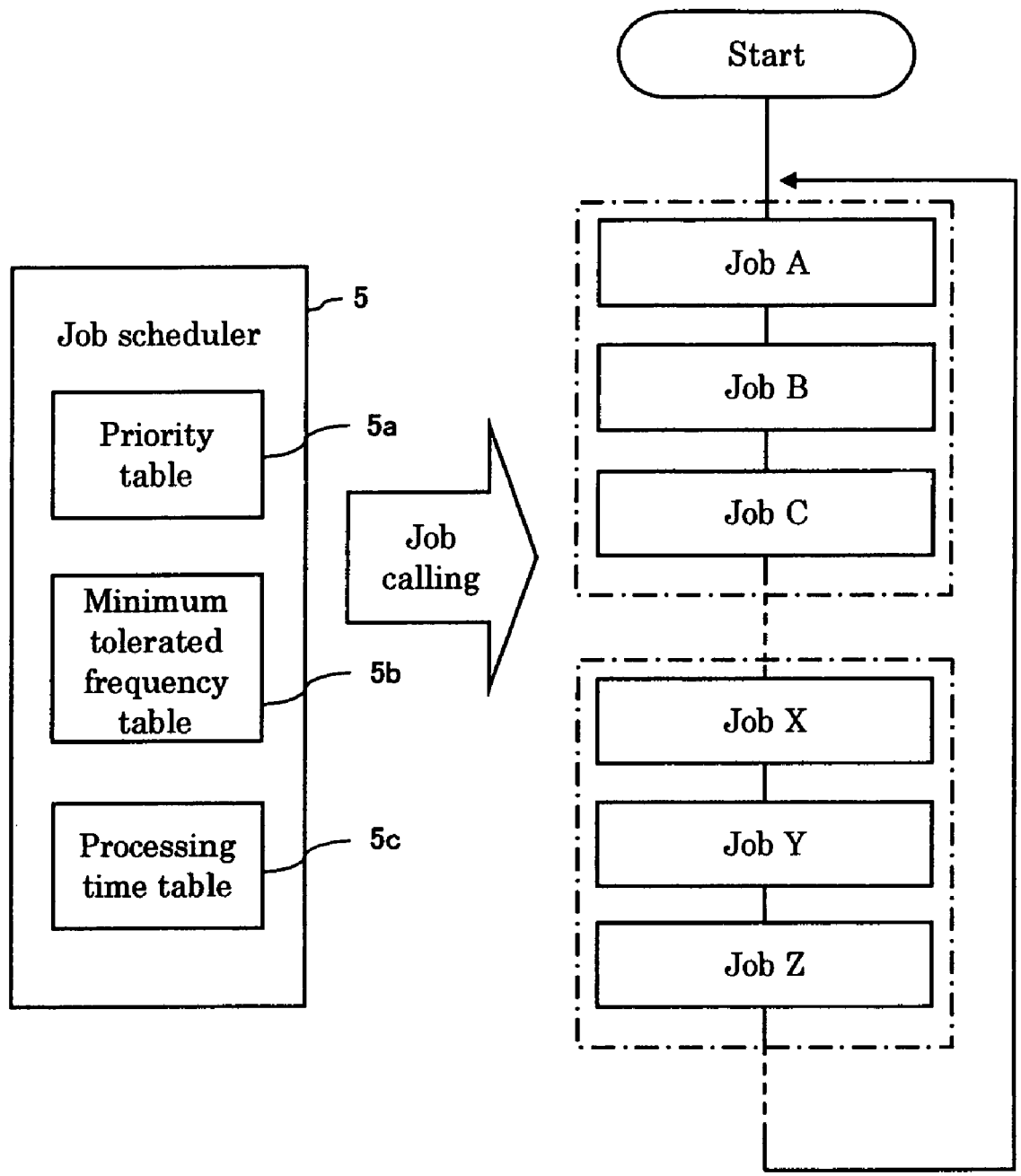
FIG. 3 is a flow chart showing an execution procedure for a job called by the job scheduler.

As shown in FIG. 3, the job scheduler 5, on the basis of a priority table 5a stored in advance in the ROM 7, turns the jobs A, B, C, . . . into a group and the jobs X, Y, Z, . . . into another group, and prioritizes and calls the jobs A, B, C, . . . to process them in order by carrying out main loop processing, while at the same time calling the jobs X, Y, Z, . . . at a rate of once out of a few to several times of calling the jobs A, B, C, . . . to process the jobs X, Y, Z, . . . in order by carrying out main loop processing.

The priority table 5a is a table showing priorities set for the jobs according to a degree of need for real-time processing of each jobs.

For example, assume that the jobs A, B, C, . . . are a group of high priority and the jobs X, Y, Z, . . . are a group of low priority. The group of the jobs A, B, C, . . . is processed on every occasion of main loop processing, while the frequency of processing the group of the jobs X, Y, Z, . . . depends on a corresponding value on a minimum tolerated frequency table 5b stored in advance in the ROM 7.

The job scheduler 5, on the basis of a value indicated by a timer counter provided in the timer interruption part 2, measures the period of time between commencement and end of processing of each group and further the period of time between commencement and end of processing of each job, and stores the processing period of time for each group and job in a processing time table 5c defined in the RAM 4.

The job scheduler 5 monitors processing intervals of each group on the basis of the processing time table 5c, and calls the group of the jobs X, Y, Z, . . . to process them in order while avoiding exceeding the corresponding value on the minimum tolerated frequency table 5b.

For example, in the case where the minimum tolerated frequency table 5b specifies, for each job, a minimum number of execution times per predetermined period of time or a minimum required execution rate, then the job scheduler 5 calculates an execution period of time for the main routine from each group's processing intervals stored in the processing time table 5c, and calls each of the groups while meeting the execution rate specified in the minimum tolerated frequency table 5b.

With this configuration, even with an incapable CPU of low performance, the job scheduler restricts the calling frequency, per cycle, of a job belonging to a group of low priority to a minimum tolerated frequency, thereby securing the execution period of time for a job belonging to a group of high priority. This secures basic real-time property that is required in a system.

The number of groups into which the jobs are divided is not limited to two; three or more groups are also possible, where, similarly, the job scheduler 5 calculates an execution period of time for the main routine from each group's processing intervals stored in the processing time table 5c, and calls each of the groups while meeting the execution rate specified in the minimum tolerated frequency table 5b.

In another preferred embodiment, the job scheduler 5 divides the above-described grouped jobs into a plurality of subgroups and alternately calls the jobs on a subgroup basis per cycle of the main loop.

For example, the job scheduler 5 divides the group of the jobs A, B, C, . . . or the group of the jobs X, Y, Z, . . . into a plurality of subgroups in descending order of priority set by the priority table 5a, and restricts the number of subgroups to be called in one cycle of the main loop for the sake of load distribution.

In the case where a job of long processing period of time and a job of short processing period of time exist within one group, the job scheduler 5 divides the plurality of jobs into subgroups so that each of the subgroups has an equal processing period of time, thereby shortening the required processing period of time, per cycle of the main loop, of the jobs included in one group. Thus, the job scheduler 5 is capable of effectively supervising execution.

In still another preferred embodiment, the job scheduler 5 dynamically changes groups or subgroups for the jobs to belong to on the basis of the processing time table 5c.

The processing period of time for a job may vary depending on conditions of the control object appliance. With the above configuration, the job scheduler 5 grasps such variation by measuring the processing period of time for each of the jobs and dynamically changes groups for the jobs to belong to on the basis of the result of the measurement, thereby securing basic real-time property that is required in a system.

Specifically, on the basis of the processing period of time for each of the jobs varying depending on conditions of the control object appliance, the job scheduler 5 can realize load distribution by dividing the jobs to equalize the processing periods of time for the groups or subgroups.

The above-described job control program is a program that carries out calling control including: dividing the jobs into a plurality of groups according to a degree of need for real-time processing of each jobs; setting a priority on a group basis; and restricting a calling frequency, per cycle, of a job belonging to a group of low priority to a minimum tolerated frequency.

Preferably, the job control program causes a computer to function to divide the grouped jobs into a plurality of subgroups and carry out calling control of the jobs in order on a subgroup basis per cycle, and causes the computer to function to measure a processing period of time for each of the jobs and dynamically change groups for the jobs to belong to on the basis of the result of the measurement.

As seen from the above description, the present invention effectively executes each of the jobs in a minimum period of time required, even with a low-performance CPU incapable of accommodating the total execution period of time for calling the jobs, thereby securing real-time property.

What is claimed is:

1. A job scheduler for scheduling jobs that control an appliance, the appliance having a single central processing unit and memory, the single central processing unit executing a job scheduler program without real-time operating system supervision, the job scheduler program being stored in memory and when executed providing instructions to the single central processing unit, the single central processing unit, for enacting the job scheduler by running a main loop of job calls, the memory storing job functions for each job to be called, the job scheduler comprising:
a priority table setting a priority for each of the jobs according to a degree of need for real-time processing that restricts an execution period of time for one cycle of the main loop for each of the jobs;
a minimum tolerated frequency table specifying a minimum required execution rate for each of the jobs; and
a control part sequentially controlling calls of each job in the main loop in a predetermined threshed order to execute each of the jobs one time per some cycles of the main loop and causing each of the jobs to be executed in the main loop by the single central processing unit without real-time operating system supervision, the control part being for carrying out calling control including:
dividing the jobs into a plurality of groups according to the degree of need for real-time processing of each jobs setting a priority on a group basis and restricting a calling frequency, per cycle of the main loop, of a job belonging to a group of low priority to a corresponding minimum tolerated frequency specified in the minimum tolerated frequency table;
wherein the control part measures a processing period of time for each of the jobs in a processing time table and dynamically changes groups for the jobs to belong to on the basis of a result of the measurement, and wherein the processing time table stores processing intervals of each group and job.

2. The job scheduler according to claim 1, wherein the control part further divides the grouped jobs into a plurality of subgroups and carries out calling control of the jobs in order on a subgroup basis per cycle of the main loop.

3. A job scheduling method for calling a job to a main loop from a memory storing a plurality of jobs for controlling an appliance, and for causing a single central processing unit to execute the job, the job scheduling method carrying out calling control including:
dividing the jobs into a plurality of groups according to a degree of need for real-time processing that restricts an execution period of time for one cycle of the main loop for each of the jobs and setting a priority on a group basis;
sequentially controlling calls of each job in the main loop in a predetermined threshed order to execute each of the jobs one time per some cycles of the main loop and causing each of the jobs to be executed in the main loop by the single central processing unit without real-time operating system supervision; and
restricting a calling frequency, per cycle of the main loop, of a job belonging to a group of low priority to a minimum tolerated frequency;
wherein the controlling further comprising measuring a processing period of time for each of the jobs in a processing time table and dynamically changes groups for the jobs to belong to on the basis of a result of the measurement, and wherein the processing time table stores processing intervals of each group and job.

4. The job scheduling method according to claim 3, further comprising carrying out calling control including: dividing the grouped jobs into a plurality of subgroups; and calling the jobs in order on a subgroup basis per cycle of the main loop.

5. A non-transitory job control program storage medium for causing a computer to function as a job scheduler for calling a job to a main loop from a memory storing a plurality of jobs for controlling an appliance, and for causing a single central processing unit to execute the job, the non-transitory job control program storage medium comprising:
a priority table setting a priority for each of the jobs according to a degree of need for real-time processing that restricts an execution period of time for one cycle of the main loop for each of the jobs;
a minimum tolerated frequency table specifying a minimum required execution rate for each of the jobs; and
a control part sequentially controlling calls of each job in the main loop in a predetermined threshed order to execute each of the jobs one time per some cycles of the main loop and causing each of the jobs to be executed in the main loop by the single central processing unit without real-time operating system supervision, the control part being for carrying out calling control including:
dividing the jobs into a plurality of groups according to the degree of need for real-time processing of each jobs setting a priority on a group basis and restricting a calling frequency, per cycle of the main loop, of a job belonging to a group of low priority to a corresponding minimum tolerated frequency specified in the minimum tolerated frequency table;
wherein the control part measures a processing period of time for each of the jobs in a processing time table and dynamically changes groups for the jobs to belong to on the basis of a result of the measurement, and wherein the processing time table stores processing intervals of each group and job.

* * * * *